April 1, 1924.
H. F. SMITH
INDICATOR
Filed Dec. 15, 1917
1,488,947
2 Sheets-Sheet 1
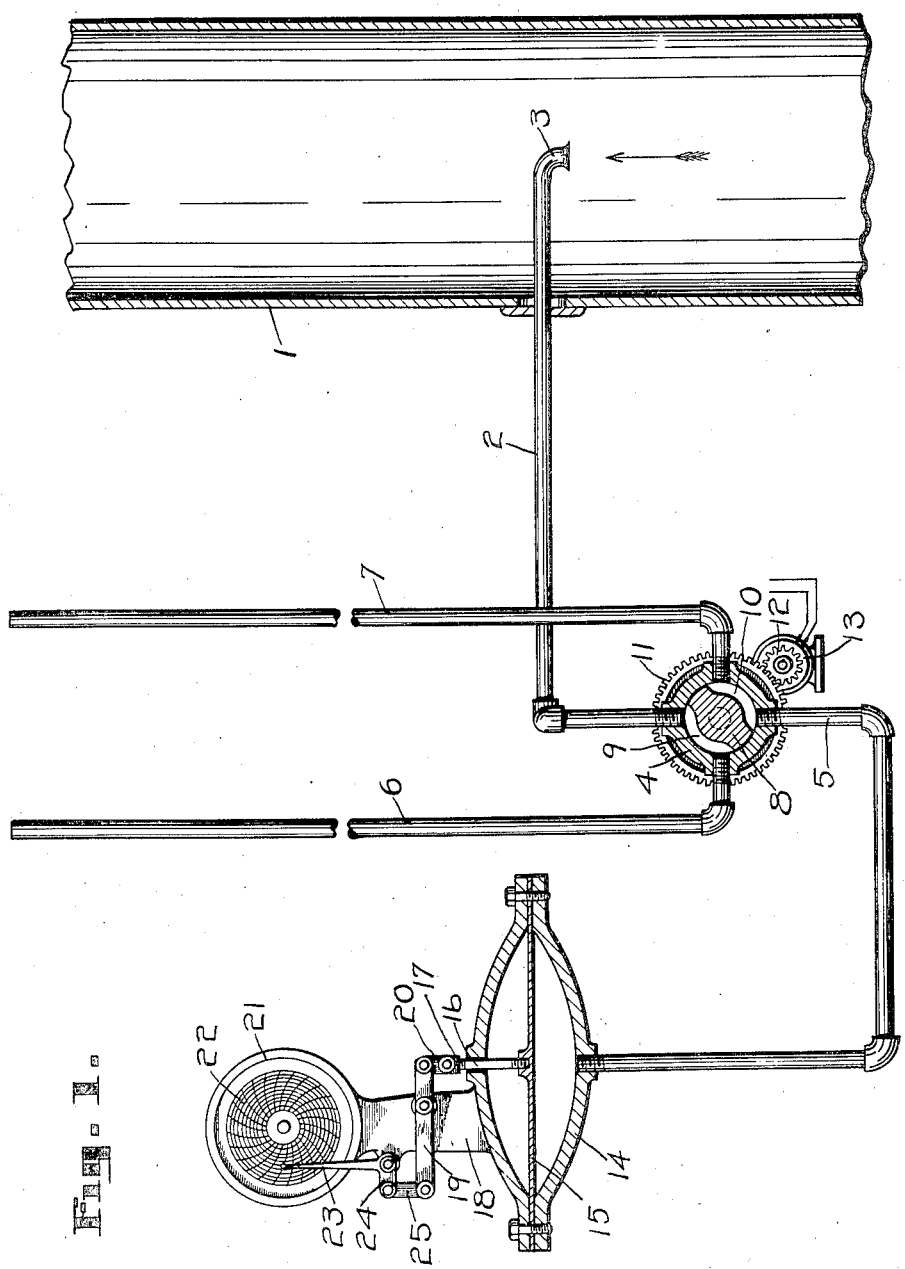
Witnesses.
Edwin James.
Inventor.
Harry F. Smith
BY Kerr, Page, Cooper & Hayward.
Attorneys.

April 1, 1924.
H. F. SMITH
INDICATOR
Filed Dec. 15, 1917      2 Sheets-Sheet 2
1,488,947
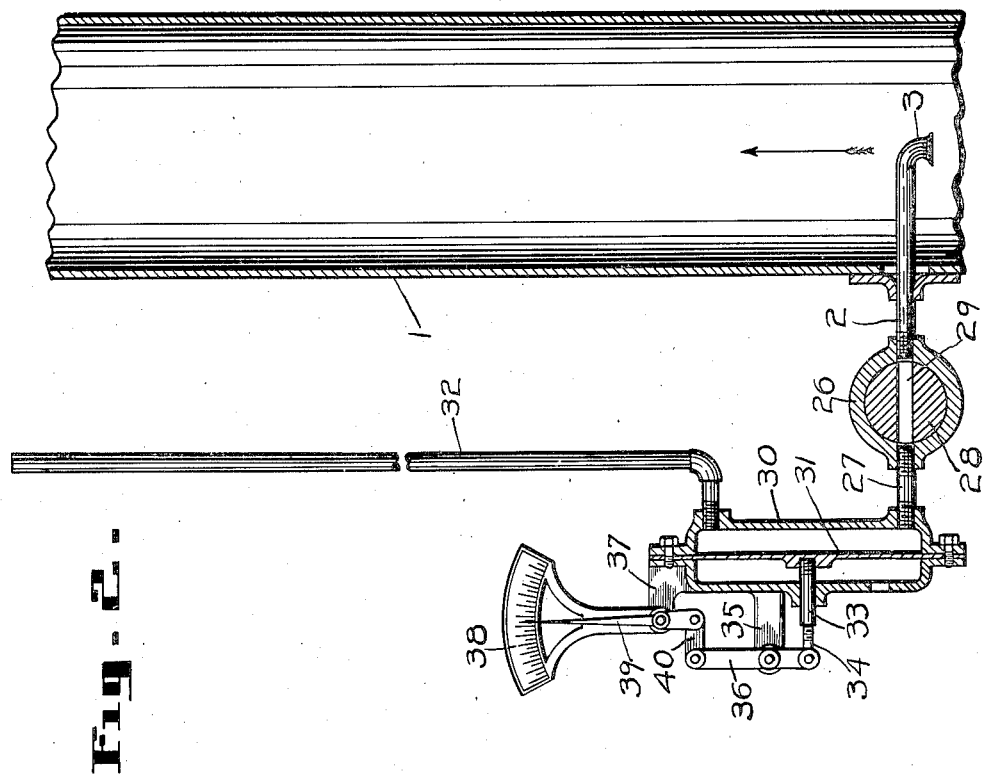
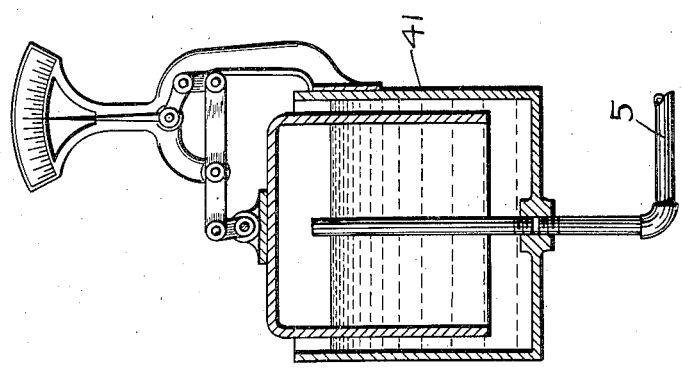

Patented Apr. 1, 1924.

1,488,947

UNITED STATES PATENT OFFICE.

HARRY F. SMITH, OF LEXINGTON, OHIO, ASSIGNOR, BY MESNE ASSIGNMENTS, TO THE GAS RESEARCH COMPANY, OF DAYTON, OHIO, A CORPORATION OF OHIO.

INDICATOR.

Application filed December 15, 1917. Serial No. 207,373.

*To all whom it may concern:*

Be it known that I, HARRY F. SMITH, a citizen of the United States, residing at Lexington, in the county of Richland and State of Ohio, have invented certain new and useful Improvements in Indicators, of which the following is a full, clear, and exact description.

This invention relates to an improved method of determining the amount of carbon dioxide in a gas, and more particularly to a method of determining the amount of carbon dioxide present in flue gases, in which variations in the relative proportion of carbon dioxide are indicated directly, and to apparatus for carrying that method into effect.

A large number of devices for determining the amount, or proportion, of carbon dioxide in flue gases have been devised at various times. These devices, however, generally embody modifications of the same basic idea of absorbing in a suitable medium the carbon dioxide carried by the flue gas, and, after such absorption, determining in some desirable manner the amount or proportion of carbon dioxide thus carried. All devices of this character are objectionable, in that, even where the arrangement is such that the percentage of carbon dioxide is indicated directly, it is necessary to renew the absorbing medium at frequent intervals. And in those devices not arranged to indicate directly the proportion of carbon dioxide, there is the added difficulty attendant upon determining by means of some form of chemical analysis the amount of carbon dioxide absorbed, and, from this determination, the proportion of carbon dioxide carried by the gas. My invention is fundamentally different from those of the absorption type, inasmuch as I make use of no absorbing medium whatsoever, but indicate directly the amount or proportion of carbon dioxide without the intervention of any such medium or the necessity for any chemical or mathematical analyses or calculations.

One object of my invention, therefore, is to provide an improved and practicable method for determining directly the proportion of carbon dioxide in flue or analogous gases without the use of any absorbing medium whatsoever, and to provide apparatus for carrying that method into effect which is sufficiently simple and durable, and at the same time sufficiently efficient to permit of practical and satisfactory application.

Other objects and advantages of the invention will be apparent from the description thereof set out below.

My invention is based on the fact that each of the constituents of flue gas, except carbon dioxide, has practically the same specific gravity as atmospheric air. This being true it is evident that varying the proportions of those constituents other than carbon dioxide, will not materially effect the specific gravity of the flue gas as a whole so long as the proportion of carbon dioxide remains constant, and that varying the proportion of carbon dioxide relative to the gas as a whole will materially effect the specific gravity of such gas. In carrying out this method I withdraw from the stack a substantial quantity of the flue gases passing therethrough and collect this portion of the gases in a suitable mechanism which is responsive to variations in the specific gravity thereof. This mechanism is operatively connected to indicating mechanism and is so arranged as to actuate such indicating mechanism in accordance with the variations in the specific gravity of the collected gas. Since these variations in the specific gravity are caused by variations in the amount or proportion of carbon dioxide present in the flue gas, the indicating mechanism is so arranged as to show directly the amount or proportion of carbon dioxide corresponding to the specific gravity of the particular portion of gas collected. If desired the mechanism for withdrawing and collecting a portion of the flue gases and for actuating the indicating mechanism according to variations in the specific gravity of the gas thus collected may be so arranged that a practically continuous record will be obtained of conditions existent in the stack.

For carrying my invention into effect I make use of apparatus similar to that illustrated in the drawing in which:

Fig. 1 is a preferred embodiment of my invention adapted to give a continuous record of variations in the proportion of carbon dioxide in the flue gases, certain parts of this apparatus being shown in section and certain other parts in elevation in order to more clearly illustrate the mechainical details thereof;

Fig. 2 is another embodiment of the invention; and

Fig. 3 is a modified form of mechanism for actuating the indicating means.

In the drawing, in which like characters of reference designate like parts throughout the several views thereof, 1 indicates generally a stack or flue for leading off from a furnace or fire box the gases forming the products of combustion. Extending into the flue 1 through the wall thereof is a pipe 2, the inner end 3 of which is bent against the direction of flow of gases through the stack 1, and is adapted to catch and pass off through the pipe 2 a substantial quantity of such gases.

The other end of the pipe 2 opens into a valve casing 4. Opening out of the casing 4 at a point diametrically opposite the point of entrance of pipe 2 is an outlet pipe 5. Leading off from opposite points of the valve casing 4 and intermediate the points of connection of the pipes 2 and 5 are two stand-pipes 6 and 7. Rotatably mounted in the valve casing 4 is a valve 8 having two ports 9 and 10 therein adapted to connect the pipes 2, 5, 6 and 7 in pairs. The ports 9 and 10 are so arranged that when one of the stand-pipes 6—7, is connected with the pipe 2, the other standpipe 6—7 is connected with the pipe 5, the arrangement being such, however, that the pipe 2 cannot be connected with the pipe 5, nor the pipe 6 with the pipe 7. As shown in the drawing the pipe 2 is connected with the standpipe 6, while the pipe 5 is connected with the stand-pipe 7. When so positioned it is evident that any flue gases passing off through the pipe 2 will pass upwardly through the stand-pipe 6, while any gases in the stand-pipe 7 will tend to pass downwardly through the valve casing and out through the pipe 5. Attached to the stem of the valve 8 is a gear 11 which meshes with a pinion 12 driven by the motor 13. Rotation of the motor 13 will cause a corresponding rotation of the valve 8 to connect each stand-pipe alternately with the pipe 2 and the pipe 5.

Attached to the other end of the pipe 5 is a diaphragm regulator 14, having a sensitive diaphragm 15 carried therein. Operatively connected to the diaphragm 15 is a rod 16 carrying thereon an adjustable pivot bearing member 17. Fulcrumed to the standard 18 carried by the regulator 14 is a lever 19, one end of which is operatively connected to the rod 16 by means of a link 20 which has its opposite ends pivoted respectively to the lever 19 and the pivot bearing member 17. Carried by the standard 18 is a recording mechanism 21 having a recording dial 22. Co-operating with this recording dial is a needle 23. The needle 23 has extending therefrom at its lower end a rigidly attached arm arranged substantially perpendicular to said needle. The needle 23 is pivoted to the standard 18 at a point practically coincident with the point of union of this needle and the arm 24, the needle and arm thus constituting in effect a bell crank lever. The free end of the arm 24 is operatively connected to one end of the lever 19 by means of a link 25. Any deformation of the diaphragm 15 will cause a corresponding movement of the rod 16 to actuate the lever mechanism connected therewith to thus vary the position of the needle 23 relative to the recording dial 22. The recording apparatus 21 may be of any conventional form, the only requisite being that the dial 22 thereof shall rotate at a predetermined rate of speed so that the needle 23 may trace a permanent record on the surface thereof as the dial thus rotates. A clock driven recording dial such as is found in the standard Bristol recording mechanism is a satisfactory type to use.

In actual practice the standpipes 6 and 7 are made of substantial height, the minimum practicable height being about 10 feet. This height is necessary in order that the quantity of gases in such pipes may be sufficiently great to cause the slight fluctuations in the proportion of carbon dioxide therein to give rise to sufficiently substantial weight variations to bring about deformation of the diaphragm 15 with consequent actuation of the lever mechanism connected to the needle 23.

The operation of the device is dependent upon the fact that any variation in the carbon dioxide content of the gases passing through the stack 1 will cause a corresponding variation in the specific gravity of that gas, and that such variation in specific gravity will not be caused by a variation in the relative proportion of the other constituent gases. This being true it is evident that if a substantial quantity of flue gas is caught in either of the stand-pipes 6—7 and such stand-pipe is then connected with the lower half of the diaphragm regulator 14 according as the specific gravity of the gas in such stand-pipe is greater or less than normal, or is greater or less than the specific gravity of that sample of gas last caught in the other stand-pipe, variation in the position of needle 23 will result. As shown in Fig. 1 of the drawing the stand-pipe 6 is connected to the pipe 2 so that a flow of gas from the stack 1 is taking place through the pipe 2, the port 9, and the stand-pipe 6 to the atmosphere. At the same time the stand-pipe 7 is connected through the port 10 to the pipe 5 and so to the lower part of the diaphragm regulator 14. In this position of the apparatus it is evident that a fresh fraction of gas is being passed into the stand-pipe 6, while that portion of the gas previously collected in the standpipe 7 is in free connection with the lower half of the diaphragm 14. In such case the needle 23 will be held in a position relative to the dial 22 corresponding to the specific gravity of the gas in the stand-pipe 7, in other words, in a position corresponding to the proportion of carbon dioxide in such gas, and so of the carbon dioxide in the flue 1 at the time such sample was taken. Rotating the valve 8 in either direction will connect the stand-pipe 6 with the pipe 5 and the stand-pipe 7 with the pipe 2. In this position of the valve the flow of gas from the flue 1 through the pipe 2 will immediately be directed to the stand-pipe 7 to fill that pipe with a fresh supply of flue gas. At the same time because of the stand-pipe 6 being connected with the diaphragm regulator 14, the diaphragm 15 therein will be affected by any variation in the specific gravity of the gases in the stand-pipe 6 when compared to the specific gravity of the gases previously collected in the stand-pipe 7. And any variation in the specific gravity of gas in the stand-pipe 6 will result in a corresponding deformation of the diaphragm 15 to cause such movement of the needle 23 as will indicate a corresponding variation in the specific gravity of the flue gasses. Of course the indicating dial 22 will in practice be so arranged as to show directly the proportion of carbon dioxide in the flue gases.

In Fig. 2 is illustrated a different embodiment of my invention. In this figure, as in Fig. 1, 1 indicates a flue or stack, having leading therefrom a gas diverting pipe 2 with the end 3 thereof deflected against the flow of gas through the stack. The pipe 2 leads into the valve casing 26. Leading off therefrom at a point opposite the point of entrance of pipe 2 is a pipe 27. Rotatably mounted in the valve casing 26 is a valve 28 having a port 29 therethrough adapted upon proper positioning of the valve to connect the pipe 2 with the pipe 27. It is obvious that I need not use the precise form of valve shown therein, as any other suitable form of valve may be used in place thereof. And this is equally true as regards the valve shown in Fig. 1.

The other end of pipe 27 leads into one side of a diaphragm regulator 30 having mounted therein a flexible diaphragm 31. Leading off from the regulator 30 on the same side of the diaphragm 31 is a stand-pipe 32. This arrangement is such that any gases carried off from the flue 1 by means of the pipe 2 will upon proper positioning of the valve 28 pass into the diaphragm regulator 30, and upwardly through the stand-pipe 32 to thus fill the stand-pipe and that portion of the regulator 30 connected therewith with such gases.

Operatively connected with the diaphragm 31 is a rod 33, having adjustably attached to the other end thereof a pivot bearing member 34. Fulcrumed to the standard 35, carried by the regulator 30, is a lever 36, one end of which is pivotally connected to the member 34. Carried by another standard 37 attached to the regulator 30, is an indicating dial 38, having an indicating needle 39 cooperating therewith. The needle 39 is pivotally mounted on the standard 37 intermediate its ends and is operatively connected to the lever 36 by means of a link 40 in such manner that movement of the link 36 about its fulcrum will result in movement of the needle 39 relative to the indicating dial 38.

With the valve in the position shown in the drawing it is evident that a portion of gas flowing through the stack 1 is passing through the valve 28 into the regulator 30 and stand-pipe 32. If it is desired to determine the proportion of carbon dioxide in the gas, the valve 28 will be moved to closed position, thus cutting off the flow of gas through the regulator and stand-pipe. As soon as valve 28 is closed the gases in the regulator and stand-pipe will come to rest will act upon the diaphragm 31, tending to deform that diaphragm and, through the lever mechanism connected therewith, to cause the needle 39 to assume a position, relative to the dial, corresponding to the specific gravity of the gas in the stand-pipe, to thus indicate the proportion of carbon dioxide in such gas.

By using the form of mechanism shown in Fig. 2, it is possible to determine at any desired time the proportion of carbon dioxide in the flue gas. By using the form of apparatus illustrated in Fig. 1, however, it is possible to automatically secure a continuous indication of the proportion of carbon dioxide in the flue gas. And it is obvious that the number of stand-pipes 6—7 may be increased as described in order to increase the number of individual indications, and thus secure a more continuous record of the character of the flue gases. Increasing the number of stand-pipes will of course make necessary a rearrangement of the passages in the valve 8, but it would of course be a simple mechanical problem to so arrange these passages that the various stand-pipes would be connected in proper sequence first with the pipe 2 and then with the pipe 5.

In Fig. 3 is shown a modified form of apparatus in which a gasometer 41 is subsituated for the diaphragm regulator 14 of Fig. 1. The lever mechanism connecting the upper bell of this gasometer to the indicating needle is substantially identical with the lever mechanism shown in Fig. 1. I have illustrated in this modification indicating mechanism similar to that shown in Fig. 2, but a recording mechanism like that shown in Fig. 1 may be substituted therefor if desired.

While the method herein described, and the form of apparatus for carrying this method into effect, constitute preferred embodiments of the invention, it is to be understood that the invention is not limited to this precise method and forms of apparatus, and that changes may be made in either without departing from the scope of the invention which is defined in the appended claims.

What I claim as new and desire to secure by Letters Patent is:

1. In a device of the character described, a gas supplying pipe, a valve casing into which said pipe opens, a plurality of stand pipes connected to said valve casing; an indicating device, pressure actuated mechanism for operating said indicating device, a pipe connecting said pressure actuated mechanism to said valve casing; and a valve member within said casing constructed to connect one of the said stand pipes to the gas supply pipe and at the same time connect another of the stand pipes to the pressure actuated mechanism through the pipe connecting said mechanism to the valve casing.

2. In a device of the character described, a stand pipe; a gas supplying pipe; a recording device, pressure actuated means for actuating said recording device; and a valve for connecting the stand pipe to the gas supplying pipe or to the pressure actuated means, said pressure actuated means being so constructed that when connected to said stand pipe it will cause the recording device to directly indicate and record the carbon dioxide content of the gas in the stand pipe corresponding to the specific gravity of said gas.

3. A device of the character described comprising a stand-pipe at all times open to the atmosphere at the upper end, a gas supplying pipe connected to said stand-pipe below its open end, a specific gravity indicating device, and a valve for connecting the stand-pipe to the gas supplying pipe or to the indicating device.

4. In a carbon dioxide indicator, a stand-pipe, a gas supplying pipe, a pressure operated indicating device, and a valve for connecting the stand-pipe to the gas supplying pipe or to the indicating device.

5. A device of the character described comprising a stand-pipe at all times open to the atmosphere at the upper end, a gas supplying pipe connected to said standpipe below its open end, a valve for connecting said stand-pipe and gas supplying pipe, and means co-operating with the said pipe to indicate the specific gravity of the gas collected in the stand-pipe.

6. In a carbon dioxide indicator, a stand-pipe, a gas supplying pipe, an indicating device, connections whereby said device is responsive to the specific gravity of the gases in the stand-pipe, and a valve for successively connecting the stand-pipe to the gas supplying pipe and to the indicating device.

7. In a device of the character described, a stand-pipe, a gas supplying pipe, an indicating device responsive to the specific gravity of the gases in the stand-pipe, and a valve for automatically connecting the stand-pipe to the gas supplying pipe and then to the indicating device.

In testimony whereof I affix my signature.

HARRY F. SMITH.